United States Patent
Bickle et al.

(10) Patent No.: US 7,056,590 B2
(45) Date of Patent: *Jun. 6, 2006

(54) PLAIN BEARING COMPOSITE MATERIAL (75) Inventors: Wolfgang Bickle, Reilingen (DE); Frank Haupert, Stelzenberg (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/516,013

(22) PCT Filed: Jun. 5, 2003

(86) PCT No.: PCT/EP03/05892

§ 371 (c)(1),
(2), (4) Date: Nov. 29, 2004

(87) PCT Pub. No.: WO03/103955

PCT Pub. Date: Dec. 18, 2003

(65) Prior Publication Data

US 2005/0208313 A1     Sep. 22, 2005

(30) Foreign Application Priority Data

Jun. 7, 2002 (DE) .................. 102 26 262
Jun. 10, 2002 (DE) .................. 102 25 783

(51) Int. Cl.
*B32B 15/08* (2006.01)
*B32B 5/02* (2006.01)
*B32B 5/16* (2006.01)
*B32B 27/18* (2006.01)
*B32B 27/04* (2006.01)

(52) U.S. Cl. .................. 428/460; 428/524; 428/297.4; 428/323

(58) Field of Classification Search .................. None
See application file for complete search history.

(56) References Cited

U.S. PATENT DOCUMENTS 4,394,275 A * 7/1983 Bickle et al. ................ 508/104

(Continued)

FOREIGN PATENT DOCUMENTS

DE    33 43 697    6/1984
DE    36 01 569    7/1987

(Continued)

OTHER PUBLICATIONS

Hansjuergen Saechtling, "Kunststoff-Taschenbuch" 22. Ausgabe, Carl Hanser Verlag 1983, pp. 302 to 307.

*Primary Examiner*—Jennifer McNeil
*Assistant Examiner*—Jason L. Savage
(74) *Attorney, Agent, or Firm*—Paul Vincent (57) ABSTRACT

The invention relates to a plain bearing composite material provided with a metallic support layer, optionally with a porous carrier layer applied thereto, and with a lead-free sliding layer, which forms a sliding partner and whose sliding layer material is based on plastic. The aim of the invention is to provide a plain bearing composite material that has a long serviceable life when used a high temperatures. To this end the sliding layer material comprises PEEK as a matrix forming plastic constituent, a lubricant provided in the form of zinc sulfide, a hardening constituent provided in the form of titanium dioxide, and additionally comprises carbon fibers. The weight percentage proportion of the lubricant and of the hardening constituent with regard to the mass of the sliding layer material ranges from 5 to 15% by weight, and the lubricant and the hardening constituent are provided in the form of fine particles having a particle size D50-value of no greater than 500 nm.

10 Claims, 7 Drawing Sheets

U.S. PATENT DOCUMENTS

| | | | |
|---|---|---|---|
| 4,655,944 A * | 4/1987 | Mori | 428/545 |
| 4,666,787 A * | 5/1987 | Bickle et al. | 428/550 |
| 4,666,792 A * | 5/1987 | Bickle et al. | 428/626 |
| 4,812,367 A * | 3/1989 | Bickle | 428/332 |
| 4,847,135 A * | 7/1989 | Braus et al. | 428/138 |
| 4,867,912 A * | 9/1989 | Heinz et al. | 528/125 |
| 5,024,881 A * | 6/1991 | Matucha et al. | 428/323 |
| 5,024,882 A * | 6/1991 | Matucha et al. | 428/323 |
| 5,039,575 A * | 8/1991 | Mori et al. | 428/463 |
| 5,332,317 A * | 7/1994 | Niwa et al. | 384/548 |
| 5,433,870 A * | 7/1995 | Nakamaru et al. | 508/104 |
| 5,643,683 A * | 7/1997 | Tanaka et al. | 428/551 |
| 5,889,102 A * | 3/1999 | Haack et al. | 524/494 |
| 5,971,617 A * | 10/1999 | Woelki et al. | 384/295 |
| 2004/0115465 A1* | 6/2004 | Bickle et al. | 428/626 |
| 2004/0126041 A1* | 7/2004 | Bickle et al. | 384/276 |
| 2004/0142199 A1* | 7/2004 | Bickle et al. | 428/553 |

FOREIGN PATENT DOCUMENTS

| | | |
|---|---|---|
| DE | 37 00 810 | 7/1988 |
| DE | 37 36 292 | 5/1989 |
| DE | 39 17 516 | 12/1990 |
| DE | 196 06 948 | 8/1997 |
| DE | 196 50 563 | 6/1998 |
| EP | 0 232 922 | 8/1987 |

* cited by examiner

Block-Ring Test Bench

Pin-Disc Test Bench

Ring-Plate Test Bench

PLAIN BEARING COMPOSITE MATERIAL

This application is the national stage of PCT/EP03/05892 filed on Jun. 5, 2003 and also claims Paris Convention priority of DE 102 26 262.4 filed on Jun. 7, 2002 and DE 102 25 783.3 filed on Jun. 10, 2002.

BACKGROUND OF THE INVENTION

The invention concerns a sliding bearing composite material with a metallic support layer, an optional porous carrier layer disposed thereon, and a lead-free sliding layer which forms a sliding surface for a sliding partner, having a sliding layer material on the basis of plastic, with PEEK and a lubricant in the form of zinc sulfide and/or barium sulfate.

A sliding bearing composite material of this type is disclosed in DE 36 01 569 A1. This reference mentions PEEK as one of several polymers, although none of the embodiments comprises PEEK. The document teaches the use of 5–40 vol % of zinc sulfide and/or barium sulfate in the sliding layer material to increase wear resistance. It mentions additives, such as glass fibers, glass beads, carbon fibers, ceramic fibers and aramide fibers to increase stability. All embodiments include glass fibers or glass beads.

DE 37 36 292 A1 discloses a sliding layer film which can be separately produced and which can be applied either directly onto a metallic support layer or via an intermediate layer which serves as a bonding agent. Suitable materials for the sliding layer are fluorinated plastic, in particular PTFE, modified PTFE, polyimide, or PEEK. None of the embodiments comprises PEEK. In accordance with this document, one or more fillers may be added to the sliding layer to increase and/or improve the thermal conductivity and/or wear properties. In particular carbon, aluminium oxide, ceramic materials, glass, bronze, molybdenum disulfide or silicon carbide can be embedded, in dependence on the application.

Sliding bearings of sliding bearing composite materials comprising a sliding layer on the basis of plastic are widely used in technology for the most varied of reasons, i.e. with regard to the loading capacity, chemical resistance and/or temperature resistance. Thermoplastic materials are known and available which guarantee thermal stability only for operating temperatures of up to approximately 90° C., which include e.g. ABS, high-pressure polyethylene (HD-PE), PVC, polysulfone (PS) etc. There are also a number of so-called technical thermoplastic materials which are suitable for operating temperatures of up to approximately 150° C., such as e.g. POM, PET, PA.

The present invention concerns such sliding bearing composite materials which are suitable for use at continuous operating temperatures of more than 180° C. They should also have very good tribological properties and favorable characteristic mechanical values with regard to shapability as well as high resistance to chemicals. The sliding bearing composite materials must moreover be suited for manufacture in an industrial production process.

These objects are achieved by a sliding bearing composite material having the features of the independent claim.

SUMMARY OF THE INVENTION

The invention has shown that the particle size of the zinc sulfide lubricant and the titanium dioxide hardening component which are added to the matrix-forming plastic component, are of great importance. Using fine particles in the region subject to wear, a "dense" homogeneous distribution of these substances in the plastic matrix can be obtained. The performance of the sliding bearing composite material can be improved with regard to low wear rates and also a favorable coefficient of friction. The above-mentioned hardening component and the lubricant of the sliding layer material are preferably present in the form of fine particles with a D50 particle size value of maximally 400 nm, preferably 100 to 350 nm. The above-mentioned D50 value of the particle size designates a particle size, with which 50 weight % of the relevant material have a larger particle size and 50 weight % have a smaller particle size. Since the added lubricant particles and the particles of the titanium dioxide hardening component are powdery particles which are to be produced by or sorted in accordance with technical methods, the curve of the particle size distribution will usually be bell-shaped: an approximately normal distribution. The D50 value of the particle size will then be close to the maximum of the bell-shaped distribution curve. In accordance with the present invention, the bell-shaped distribution curve is preferably such that at least 60%, in particular at least 70%, and most preferably at least 80 weight % of the relevant substance has a particle size within a particle size range about the bell maximum or about the D50 value of ±50%, for a D50 value of 330 nm, in a particle size region of 330 nm±165 nm, i.e. of 165 nm to 495 nm.

Moreover, it has proven to be suitable if the particle size distribution is such that the sum residue in weight % for a screen analysis with varying mesh width t, in particular between 1 μm and 100 nm, can be described by the following relationship:

$$-(t/d)^\beta \cdot S = 100 \cdot e$$

wherein, in a particularly advantageous manner, the characteristic grain size d is between 0.34 and 0.54 μm and the forming parameter β of the distribution is between 2.4 and 3.4. A preferred distribution is distinguished by a characteristic grain size of 0.440 μm (440 nm) and a forming parameter β of 2.87.

The addition of carbon fibers reinforces the sliding layer of the sliding bearing composite material by increasing its rigidity and solidity as well as its creeping strength. Carbon fibers also increase the wear resistance. The thermal conductivity, which is of particular importance is also improved by the addition of carbon fibers to the sliding layer. These fibers prevent overheating of the sliding layer by discharging the frictional heat, which is generated during operation directly on the surface of the sliding layer, to the inside of the sliding bearing composite material, in particular, to the metallic component of an optionally provided porous carrier layer or directly to the metallic support layer.

The sliding bearing composite material comprising polyetherether ketone (PEEK) as matrix-forming plastic component, in connection with the other claimed components is stable at high temperatures, i.e. it can be used on a continuous basis at temperatures of more than 180° C., e.g. 190 to 250° C. Polyphenylene sulfone (PPS) would, in principle, be suitable as a matrix-forming plastic component of a sliding layer material in view of its temperature stability of up to 260° C. However, PPS forms an inadequate matrix in view of its retaining capacity, as it tends to burst open during shaping and also does not meet the tribological performance of PEEK.

The present invention does not exclude one or more further thermoplastic materials from being contained in the sliding layer material in addition to PEEK as a matrix-forming plastic component. Their portion should not exceed 20 weight %, in particular 10 weight % of the portion of the plastic component in the sliding layer material. The plastic component is preferably 100% PEEK.

Moreover it has turned out that, in the inventive sliding bearing composite material, the addition of PTFE, which is contained in conventional sliding materials in an amount between 2 and 15 weight %, can be omitted even under extreme load conditions. It is assumed that the influence of PTFE on the tribological properties of a material composition which is desired per se, is substituted by the claimed zinc sulfide component and the alternatively or additionally claimed barium sulfate component.

In accordance with a preferred embodiment of the invention, the carbon fibers are advantageously short fibers of a length of between 50 and 250 μm, in particular 60 to 150 μm. It has turned out that in this case, homogeneous distribution of the carbon fibers in the sliding layer material is also obtained within the pores of the optionally provided porous carrier layer, which may e.g. be a bronze layer, in particular a lead-tin-bronze layer. This further improves the thermal conductivity by effectively discharging the produced heat to the porous carrier layer. Carbon fibers having a thickness of 8 to 15 μm have proven to be advantageous.

The weight percentage portion of the carbon fibers referred to the mass of the sliding layer material is preferably 5 to 25 weight %, in particular 5–15 weight %. It has proven to be advantageous if the sliding layer material has additives of graphite particles in a weight percentage portion, relative to the mass of the sliding layer material, of 5 to 15 weight %. The graphite particles should preferably be present as fine particles of a particle size of maximally 15 μm, in particular 1–15 μm, preferably 1–5 μm.

It has also turned out that the inventive sliding layer material shows excellent adhesion to a metallic support layer. The porous carrier layer may consequently be omitted.

The sliding layer composite material can be produced by the following method.
 supplying and pre-heating a strip material forming the carrier layer,
 forming a strip-shaped sliding layer material from the previously mixed and molten sliding layer material through extrusion of the molten mass,
 supplying the strip-shaped sliding layer material onto the strip material forming the carrier layer and joining under pressure at temperatures of 300 to 500° C.

Extrusion of the plastic sliding material into a thin strip shape and disposing the strip onto the heated carrier strip produces substantial advantages. It has turned out that the plastic sliding material can be introduced into the pores of the porous carrier layer in this manner without previous grinding.

Further features, details and advantages of the invention can be extracted from the claims and the drawing and the following description of material compositions and their properties.

DESCRIPTION OF THE PREFERRED EMBODIMENT

Figure 1:
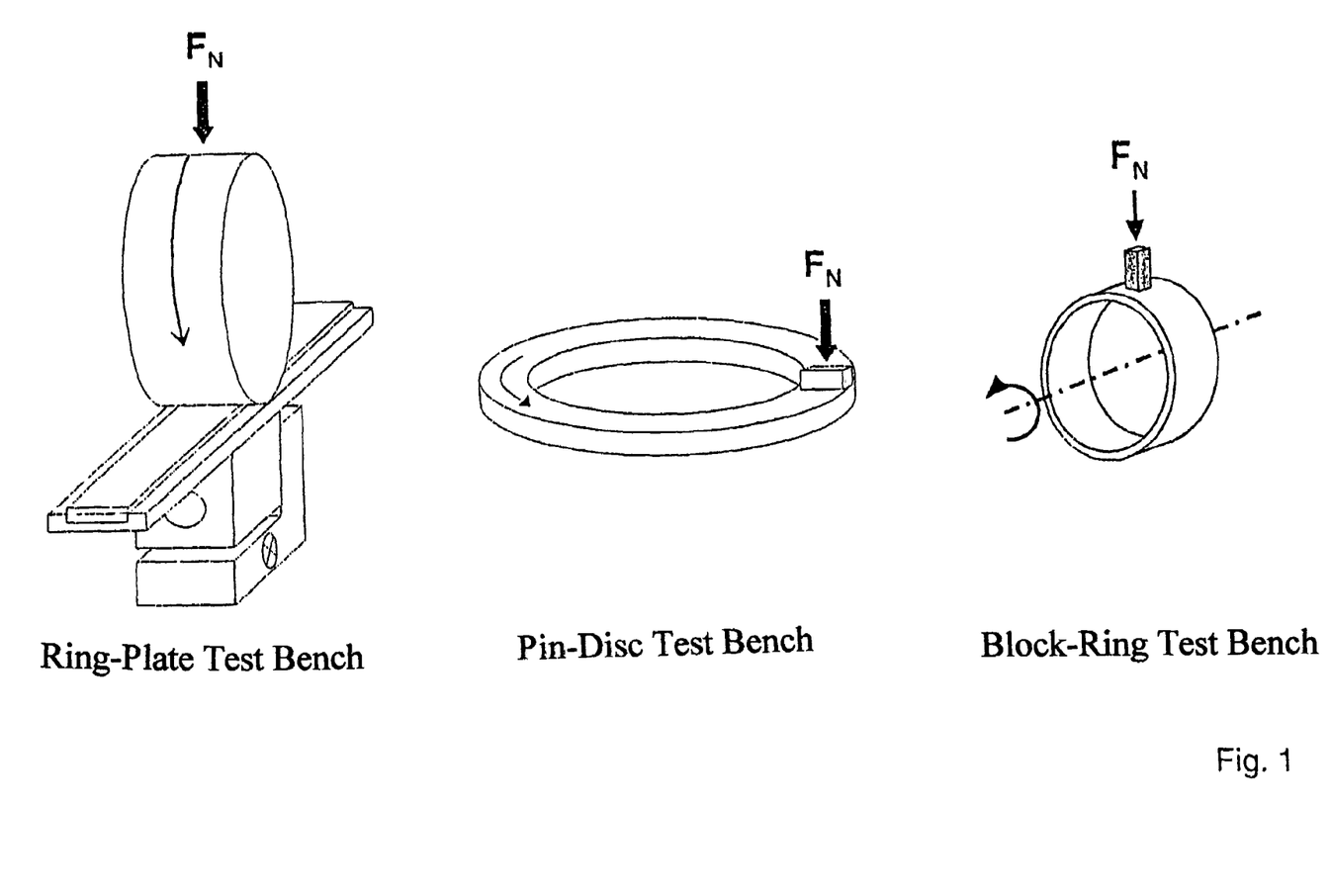
FIG. 1 shows a schematic illustration of various test methods or test benches.

The following test results were obtained through different test methods which are known per se. Tests (schematically shown in FIG. 1) on a so-called ring-plate test bench (FIG. 1 left-hand side), on a pin-disc test bench/FIG. 1, center) and on a block-ring test bench (FIG. 1, right-hand side) were carried out.

A comparable material designated with P23 was examined wherein the sliding layer material contains PVDF as matrix-forming plastic component and lead and PTFE as lubricants. Moreover, a sliding bearing composite material with a sliding layer of an available sliding layer material with PEEK as matrix-forming plastic component and the composition, shown in the following table under PEEK4, was examined. The carbon fibers of the material PEEK4 have a length of 1000 μm–5000 μm.

| Designation | Matrix | ZnS weight % | C fibers weight % | PTFE weight % | Graphite weight % | TiO$_2$ weight % |
|---|---|---|---|---|---|---|
| PEEK4 | Rest PEEK | — | 10 | 10 | 10 | — |
| PEEK5 | Rest PEEK | 10 | 10 | 10 | — | — |
| PEEK6 | Rest PEEK | 10 | 10 | — | 10 | 10 |
| PEEK7 | Rest PEEK | 10 | — | — | 10 | 5 |

The composite materials with designations PEEK 5, 6, 7 were then tested with sliding layer material compositions which can be gathered from the table. For all materials, the sliding layer material was introduced into a porous carrier layer which is sintered onto a steel support layer.

Figure 2:
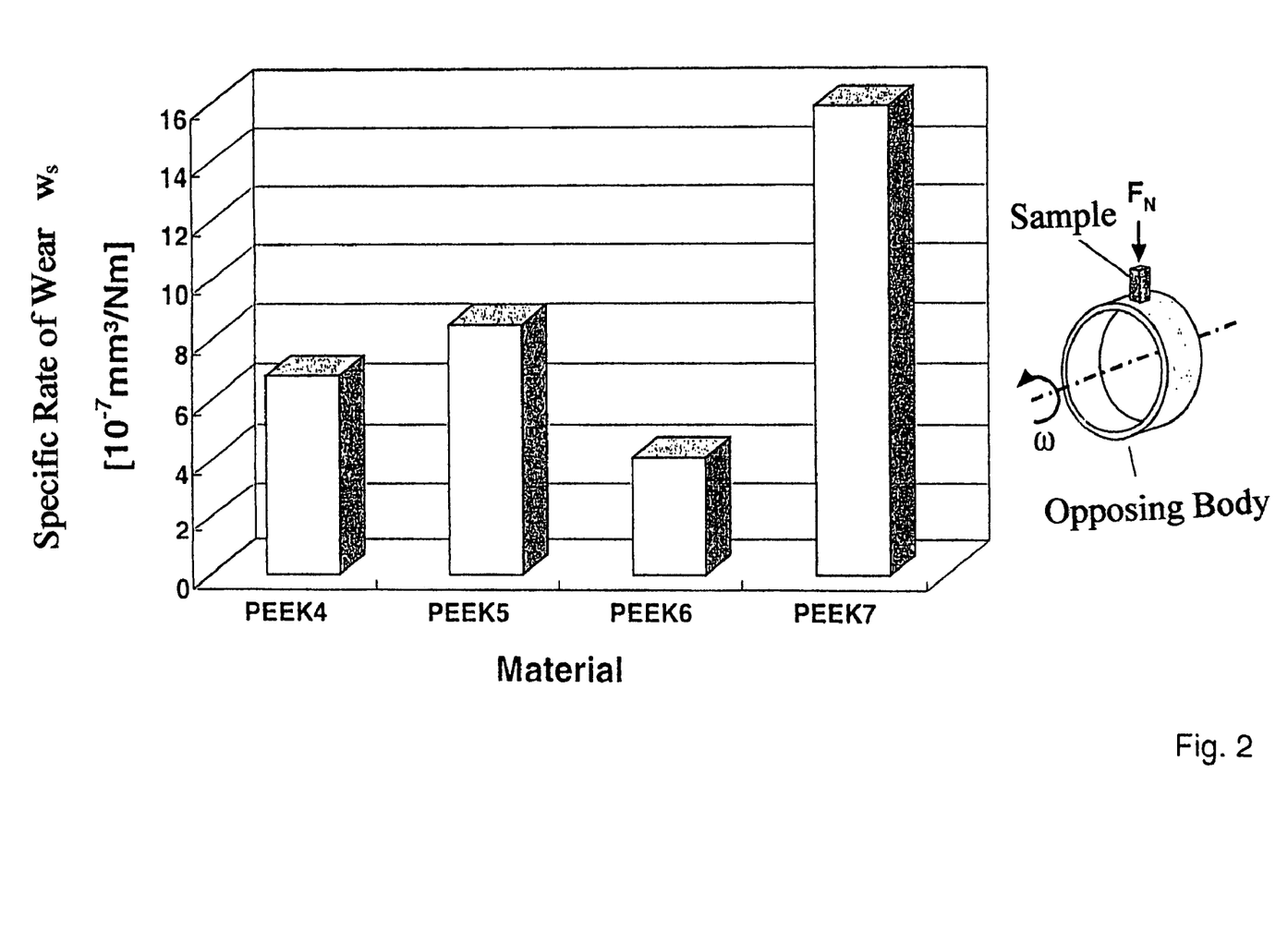
FIG. 2 shows a graphic illustration of the measurement of specific wear rates under various test conditions using a first test method of FIG. 1.
Figure 3:
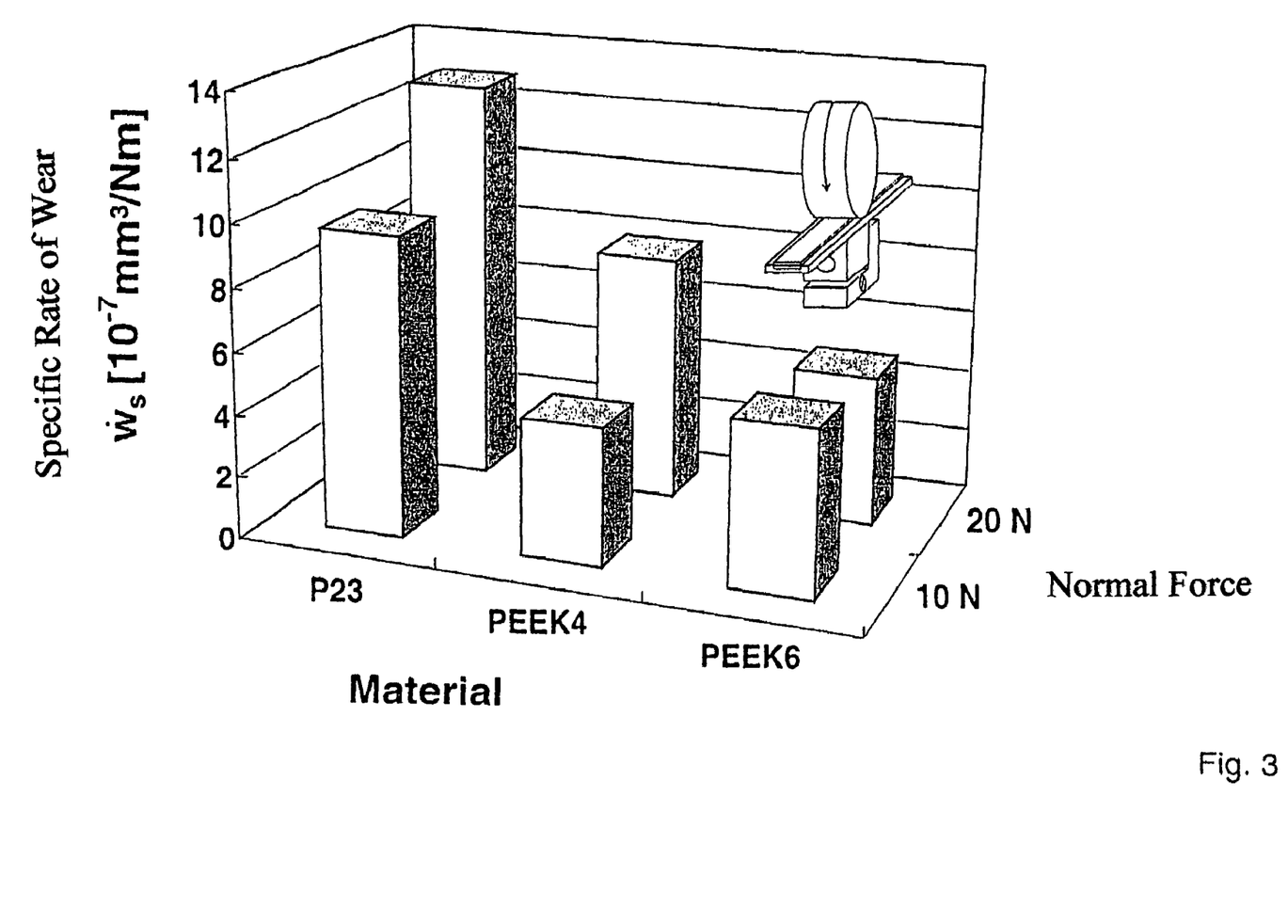
FIG. 3 shows a graphic illustration of the measurement of specific wear rates under various test conditions using a second test method of FIG. 1.
Figure 4:
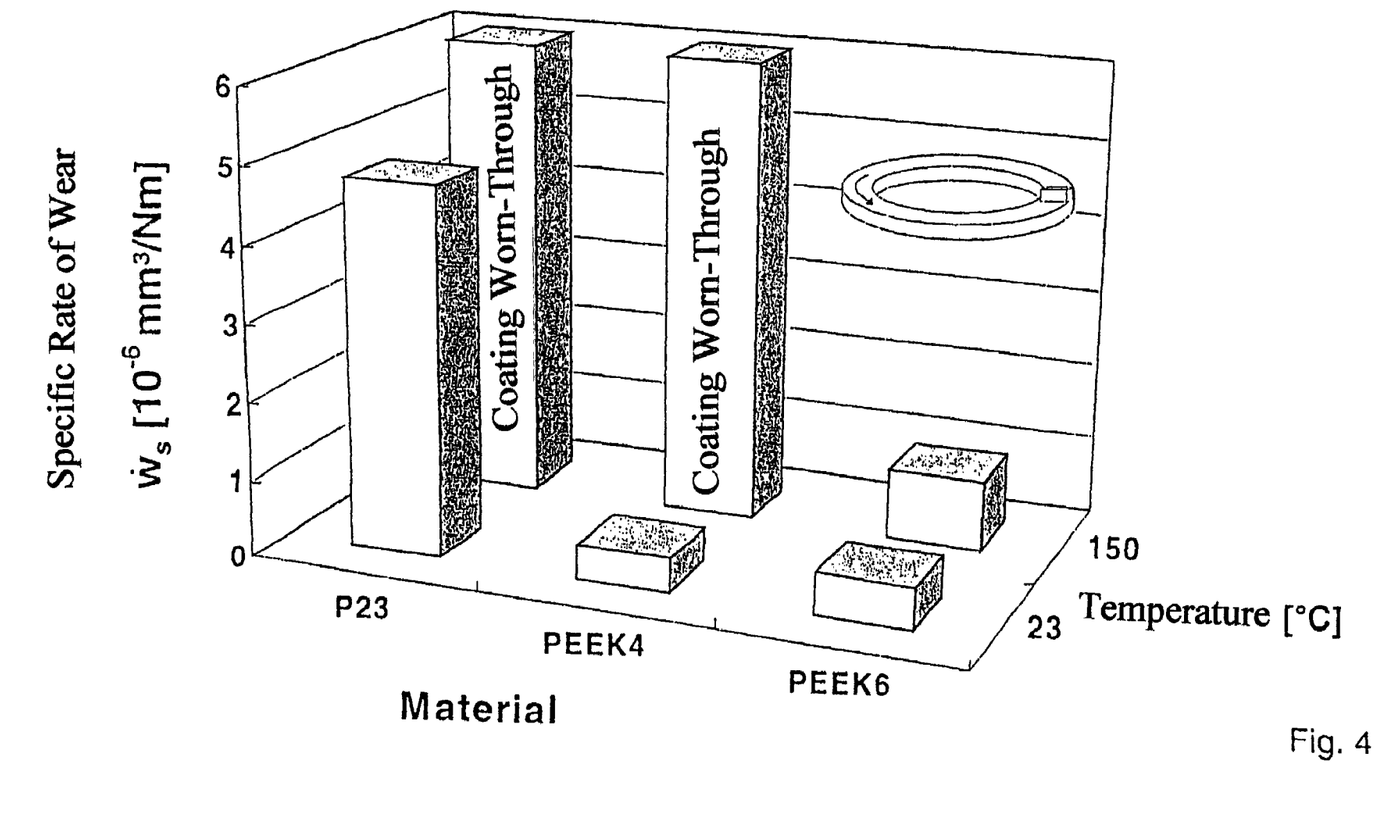
FIG. 4 shows a graphic illustration of the measurement of specific wear rates under various test conditions using a third test method of FIG. 1.

FIGS. 2, 3, and 4 show the test results of the specific wear rate which were obtained on a block-ring test bench (FIG. 2, the sliding layer material forms the "block", but it is present in "bulk" form, i.e. not on a porous carrier layer), and on a ring-plate test bench (FIG. 3) or a pin-disc test bench (FIG. 4). In the test in accordance with FIG. 2 the following parameters were used:

| | |
|---|---|
| Test duration: | 20 h |
| Surface pressure: | 1 Mpa |
| Sliding speed: | 1.0 m/s |
| Counter body: | 100Cr6, $R_a$ = 0.1–2 µm |
| Lubrication: | none |
| Room temperature | |

In the test in accordance with FIG. 3 the following parameters were used:

| | |
|---|---|
| Test duration: | 20 h |
| Sliding speed: | 1.57 m/s |
| Counter body: | 100Cr6, $R_a$ = 0.1–0.2 µm |
| Lubrication: | none |
| Room temperature | |

Measurements were carried out at two different pressures of the ring against the plate of 10 N and 20 N.

In the test in accordance with FIG. 4 the following parameters were used:

| | |
|---|---|
| Test duration: | 20 h |
| Surface pressure: | 0.5 Mpa |
| Sliding speed: | 1.57 m/s |
| Counter body: | 100Cr6, $R_a$ = 0.1–0.2 µm |
| Lubrication: | none |

Measurement was carried out at two different temperatures, i.e. room temperature of 23° C., and 150° C. The measurements show that in the test of FIG. 2, the inventive sliding bearing composite material PEEK6 had a smaller specific wear rate compared to the comparable materials, i.e. has a higher wear resistance. The test of FIG. 3 showed that the inventive sliding bearing composite material PEEK6 is superior at high surface pressures, i.e. high loads compared to other materials. It shows in particular that omission of carbon fibers and reduction of TiO$_2$ in PEEK7 had a negative effect on the wear resistance compared to PEEK6, i.e. the wear rate increases. In contrast thereto, addition of TiO$_2$ to PEEK6 based on PEEK5, which contains no TiO$_2$ reduces the wear rate.

The test of FIG. 4 showed a superior temperature resistance of the inventive material PEEK6 whereas the other two comparable materials were not able to meet the requirements and failed, since their sliding layer and a porous carrier layer disposed onto the support layer were completely abraded down to the steel support layer.

Figure 5:
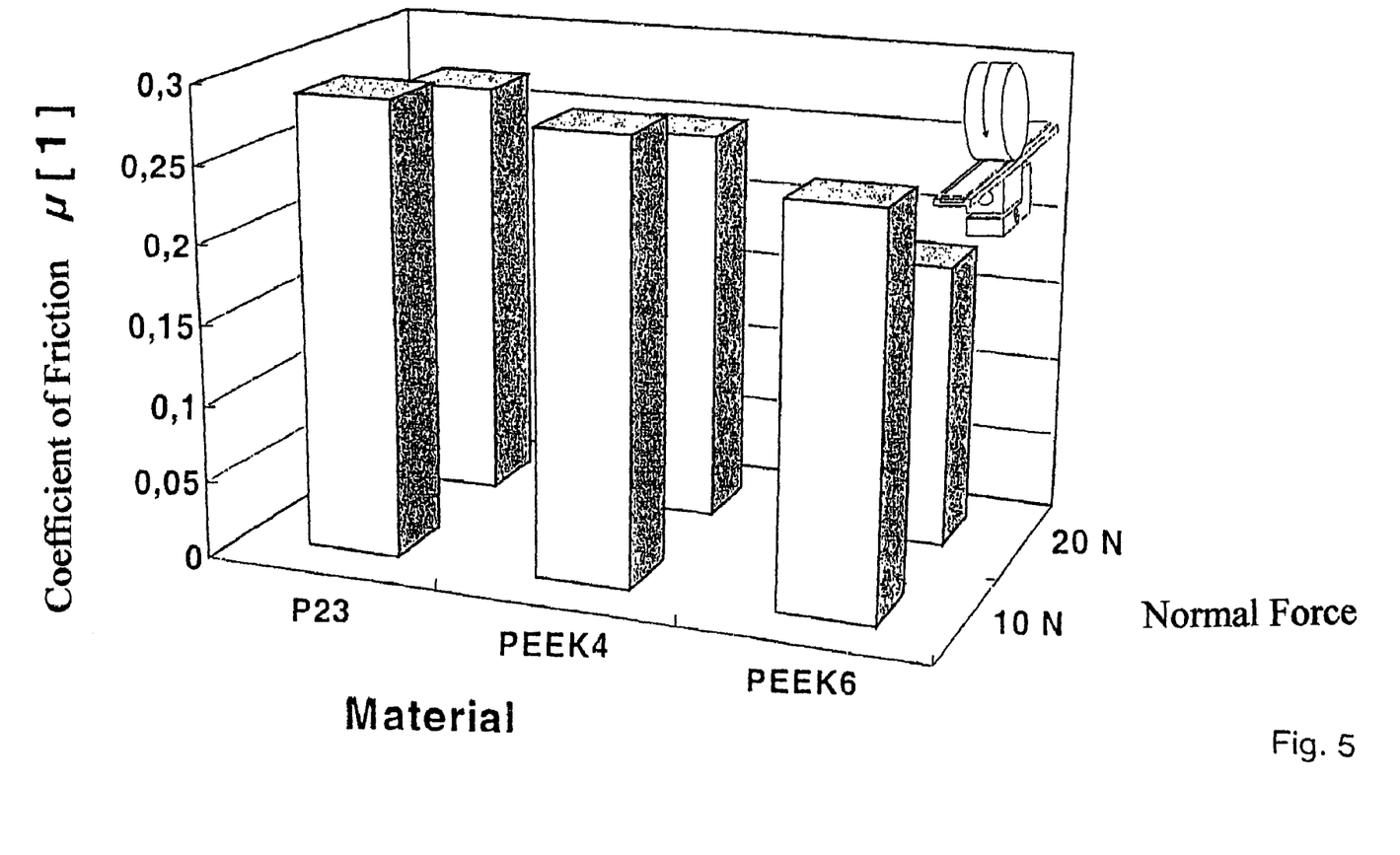
FIG. 5 shows a graphic illustration of the measurement of the:coefficient of friction for different materials under first test conditions.
Figure 6:
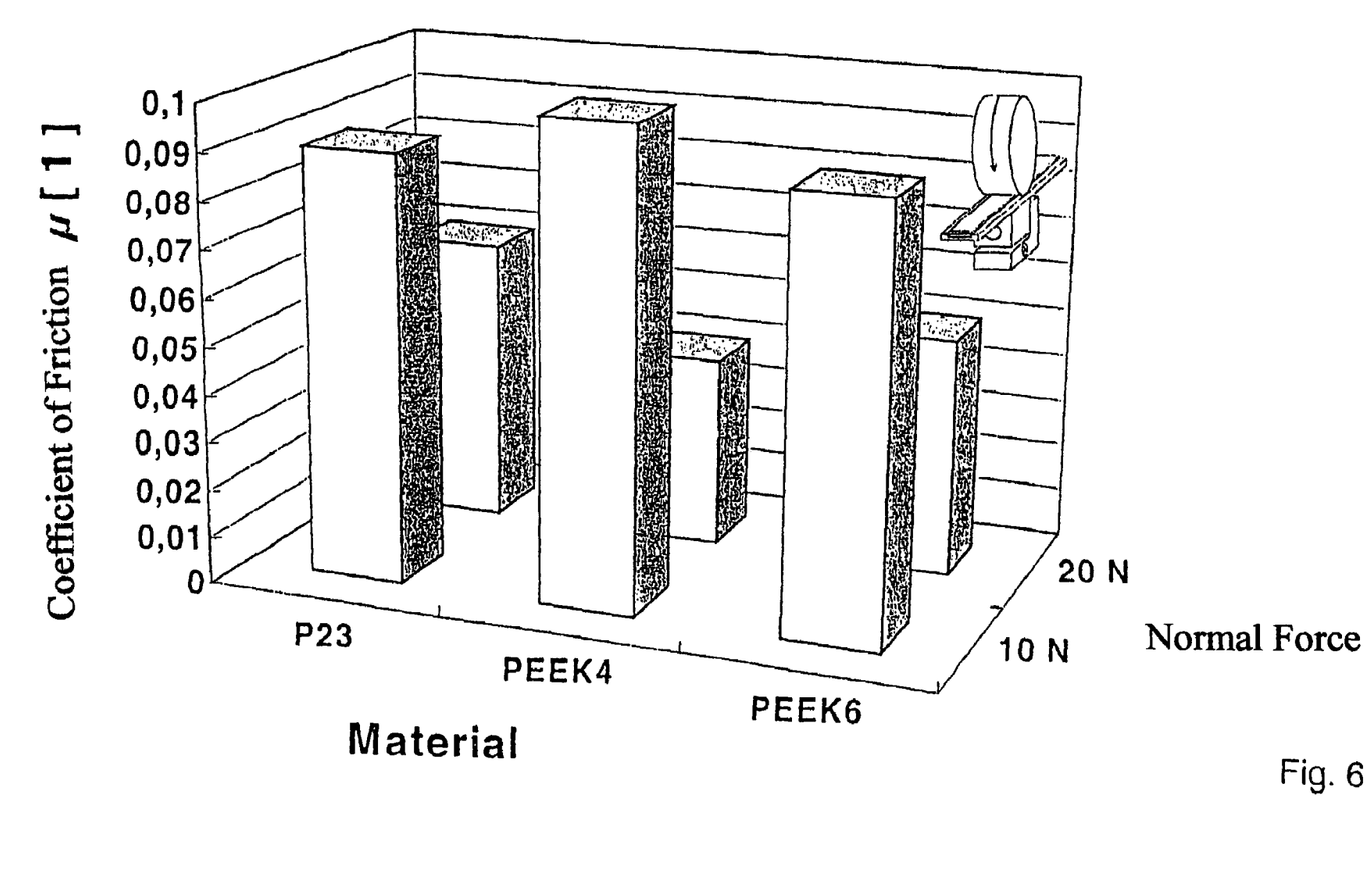
FIG. 6 shows a graphic illustration of the measurement of the coefficient of friction for different materials under second test conditions.
Figure 7:
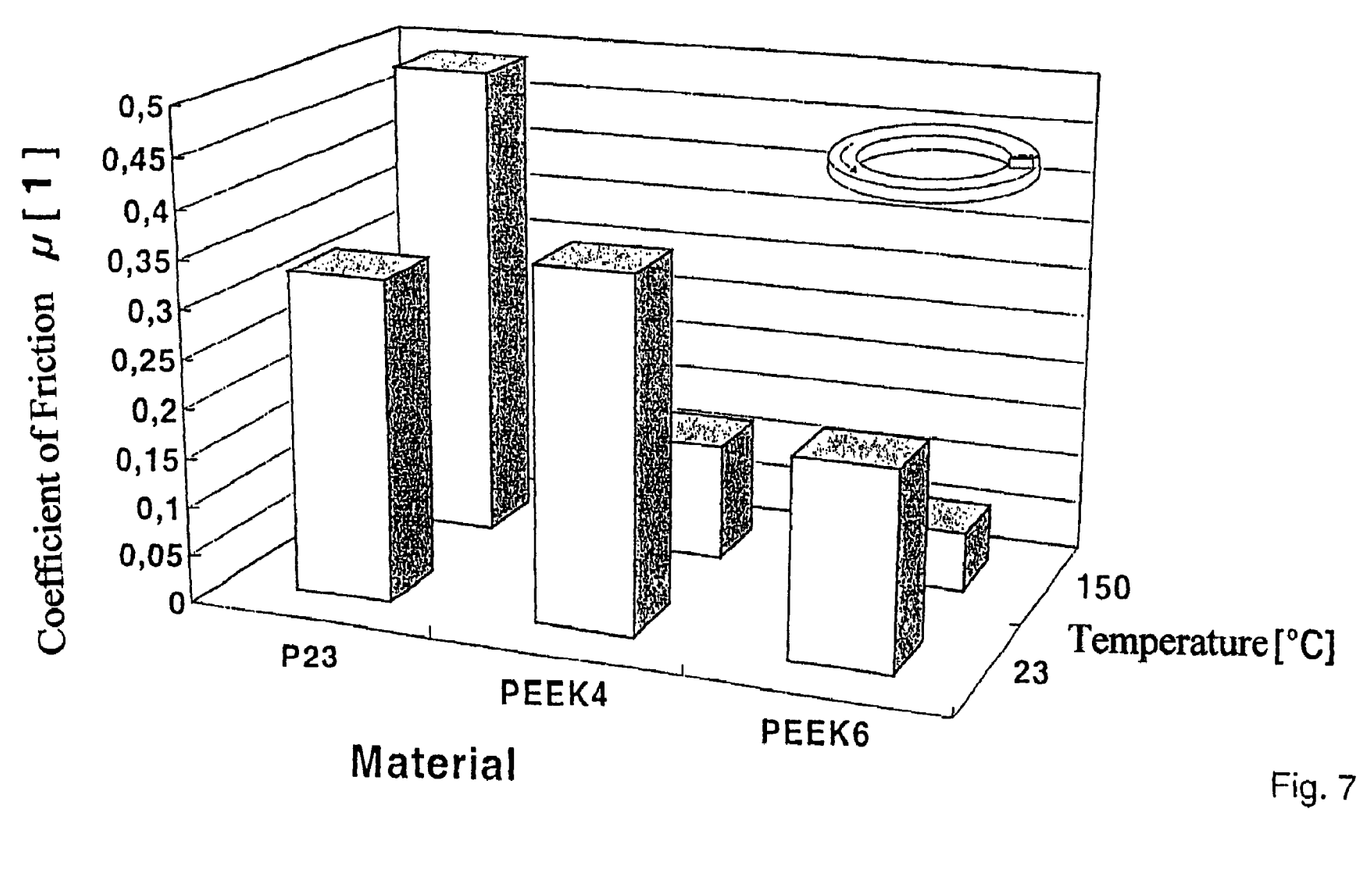
FIG. 7 shows a graphic illustration of the measurement of the coefficient of friction for different materials under third test conditions.

FIGS. 5 through 7 show tests of the coefficient of friction of the above-mentioned comparable materials P23, PEEK4 and of the inventive material PEEK6.

The test parameters in accordance with FIG. 5 were:

| | |
|---|---|
| Test duration: | 20 h |
| Sliding speed: | 1.57 m/s |
| Counter body: | 100Cr6, $R_a$ = 0.1–0.2 µm |
| Lubrication: | none |
| Room temperature | |

In this test on a ring-plate test bench, the coefficient of friction of the materials was measured with two different pressures of 10 and 20 N.

The test parameters in accordance with the test of FIG. 6 on a ring-plate test bench were:

| | |
|---|---|
| Test duration: | 72 h |
| Sliding speed: | 1.57 m/s |
| Counter body: | 100Cr6, $R_a$ = 0.1–0.2 µm |
| Lubrication: | initial lubrication |
| Room temperature | |

This test of the coefficient of friction differs from that of FIG. 5 in that initial lubrication was used, whereas the test in accordance with FIG. 5 was carried out without lubrication. The test duration is approximately three times as long. The inventive material is again superior at the higher pressure.

The test parameters of the test of FIG. 7 were:

| | |
|---|---|
| Test duration: | 20 h |
| Surface pressure: | 0.5 Mpa |
| Sliding speed: | 1.57 m/s |
| Counter body: | 100Cr6, $R_a$ = 0.1–0.2 µm |
| Lubrication: | none |

A test of the coefficient of friction on a pin-disc test bench at two test temperatures, i.e. room temperature of 23° C. and an increased temperature of 150° C. showed that the inventive material PEEK has a superior temperature resistance compared to the comparable materials.

A preferred composition of the inventive sliding bearing composite material is provided by a support layer of steel and a porous carrier layer of bronze disposed thereon, e.g. copper-tin-bronze, such as CuSn10, and a sliding layer of a sliding layer material of a composition in accordance with the embodiment PEEK6, with 10 weight % ZnS, 10 weight % carbon fibers, 10 weight % graphite particles and 10 weight % TiO$_2$. Zinc sulfide as lubricant and titanium dioxide as hardening substance are present in the materials PEEK 5, 6, and 7 in the form of extremely fine particles, wherein the zinc sulfide has an average particle size with a D50 value of approximately 300 nm and the titanium dioxide has an average particle size with a D50 value of approximately 300 nm. This produces particularly fine homogeneous structures and particularly low friction and wear values. The carbon fibers of the PEEK 5, 6, and 7 materials have a length of 50 to 250 µm, preferably 60 to 150 µm, and their average diameter is 8 to 15 µm. The size of the graphite particles is up to 15 µm, in particular 1–15 µm, preferably 1–5 µm. PEEK forms the rest of the plastic sliding bearing material. Calculated for a volume percentage composition, the volume percentage portion of the PEEK matrix is preferably between 55 and 90 vol %. A preferred composition consists of 75 vol % of PEEK4, 4 vol % of ZnS, 10 vol % of short carbon fibers, 7 vol % of graphite and 4 vol % of $TiO_2$.

We claim:

1. A sliding bearing composite material comprising:
   a metallic support layer;
   a lead-free sliding layer forming a sliding surface for a sliding partner, said sliding layer comprising PEEK as a matrix-forming plastic component, a lubricant in the form of zinc sulfide and/or barium sulfate, a hardening component in the form titanium dioxide, and additional carbon fibers, wherein said lubricant and said hardening component each have a portion of 5–15 weight % relative to a mass of said sliding layer material and said lubricant and said hardening component are particles having a particle size D50 value of not more than 500 nm.

2. The sliding bearing composite material of claim 1, further comprising a porous carrier layer disposed on said support layer.

3. The sliding bearing composite material of claim 1, wherein said lubricant and said hardening component have a particle size D50 value of not more than 400 nm.

4. The sliding bearing composite material of claim 3, wherein said D50 particle size value is 100–350 nm.

5. The sliding bearing composite material of claim 1, wherein said carbon fibers have a length of 50–250 μm.

6. The sliding bearing composite material of claim 1, wherein said carbon fibers have a length of 60–150 μm.

7. The sliding bearing composite material of claim 1, wherein said carbon fibers have a thickness of 8–15 μm.

8. The sliding bearing composite material of claim 1, wherein a weight % portion of said carbon fibers relative to said mass of the sliding bearing material is 5–25 weight %.

9. The sliding bearing composite material of claim 8, wherein a weight % portion of said carbon fibers relative to said mass of the sliding bearing material is 5–15 weight %.

10. The sliding bearing composite material of claim 1, further comprising graphite particles in a weight % portion of 5–15 weight %, relative to said mass of the sliding layer material.

* * * * *